Oct. 23, 1934.    A. W. BERGENER    1,977,607
FLOUR SIFTER OR THE LIKE
Filed Nov. 25, 1931
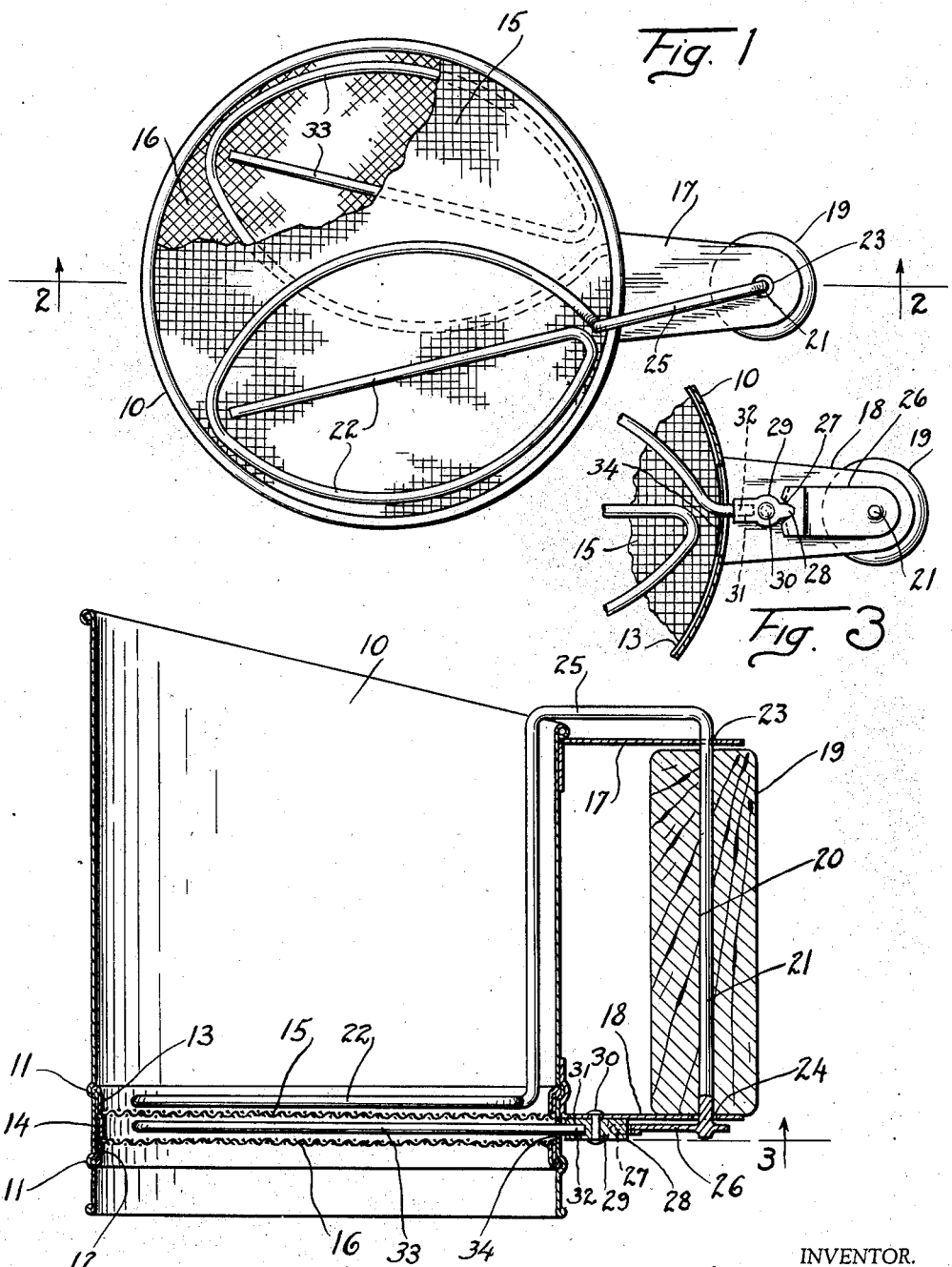

Patented Oct. 23, 1934

1,977,607

UNITED STATES PATENT OFFICE 1,977,607

FLOUR SIFTER OR THE LIKE

August W. Bergener, Buffalo, N. Y., assignor to Republic Metalware Company, Inc., Buffalo, N. Y., a corporation of New York Application November 25, 1931, Serial No. 577,308

4 Claims. (Cl. 209—357)

This invention relates to flour sifters of the type wherein the handle by which the container is supported is also employed for actuating an agitator or agitators placed immediately above and in juxtaposition to one or more sieves or screens.

The principal object of the present invention is to provide a new and improved construction for a flour sifter wherein a plurality of sieves are provided and having agitators one above each screen with means for actuating said agitators simultaneously but in opposite directions from the handle by which the container is supported.

Another object is to provide a new and improved but relatively inexpensive construction for a device of the character described.

A further object is to provide a construction in which a novel form of linkage mechanism is employed for operating one of the agitators from the supporting handle and in so connecting one of the other agitators to the handle that when the container is supported by the handle and at the same time a shaking movement is imparted to the container the agitators referred to will be caused to oscillate across their respective sieves in opposite directions.

The above and other objects of the present invention will be readily apparent from the following more detailed description and by reference to the accompanying drawing forming a part hereof wherein is shown a satisfactory practical and commercial embodiment of a flour sifter constructed in accordance with the principles of this invention and wherein:

Fig. 1 is a plan view of a flour sifter embodying the principles of the invention.

Fig. 2 is a sectional line 2—2 of Fig. 1, and

Fig. 3 is an enlarged sectional detail taken on the line 3 of Fig. 2.

As shown in the drawing, the numeral 10 indicates the container of a flour sifter which container may be of any suitable size and shape but which is shown as of the usual hollow cylindrical shape. Adjacent to the bottom thereof, the side wall of the container 10 is provided with a pair of beads 11 which provide annular recesses in the inner wall of the container that serve to maintain in position a pair of sheet metal rings 12 and 13. Located intermediate to the rings 12, 13, is a third ring 14. These rings serve to support fixedly within the container an upper sieve or screen 15 and a lower sieve or screen 16, as will be readily understood from an inspection of the drawing.

Suitably secured to the outer face of the side wall of the container 10 is an upper bracket 17 and a lower bracket 18. These brackets project laterally from the container as shown and serve to support between them a supporting handle 19. The handle 19 is provided with a central opening or bore 20 in which is snugly fitted the vertically extending portion 21 of one end of a piece of stiff wire which at the other end is bent to form an agitator 22 of any suitable shape or size. The vertically extending portion 21 of the wire which forms the agitator passes through suitable axially aligned apertures 23 and 24 provided in the brackets 17 and 18 respectively, the wire at the upper end of the vertical portion 21 projecting upwardly beyond the bracket 17 a distance sufficient to permit the horizontally extending portion indicated by the reference character 25 to clear the adjacent upper edge of the container 10. At its lower end, the vertically extending portion 21 of the wire projects downwardly beyond the bracket 18 and has fixedly secured to it in any suitable manner a small operating lever 26. This lever 26 is provided at its inner or free end with an open ended notch or slot 27 within which is engaged a lug 28 provided at one end of a second lever 29. The lever 29 is pivotally connected to the bracket 18 by any suitable means, such as the rivet 30, and has at the end opposite to the lug 27 a small bore 31 in which is rigidly secured the end 32 of a second piece of stout wire. This piece of wire is formed at its other end into an agitator 33 similar to the agitator 22. Just immediately below the lower bracket 18, the side wall of the container is cut away to form an elongated slot 34 through which the end portion 31 of the lower agitator 33 projects.

As is clearly shown from the drawing, the agitators 22 and 33 are mounted closely adjacent to and above the upper and lower screens or sieves 15, 16, respectively.

The manner in which the device operates is as follows:

Let it be assumed that it is desired to sift some flour or other material. The material to be sifted is placed within the container 10 and the container is held above a bowl or other receptacle by means of the handle 19 and a slight sideways shaking movement or oscillation is imparted to said handle 19. The weight of the material within the container tends to hold the container relatively stationary while the sideways shaking movement produces a slight rotation or oscillation of the handle 19 relatively to the brackets 17, 18 and the container. This relative rotation of the handle 19 obviously will be imparted to the upper agitator 22 because of the tight engagement with the handle of the vertical portion 21 of the wire which forms the said agitator 22, and consequently the agitator 22 will be swept backward and forward in an arc above the upper screen 15 thereby causing the material within the container to be sifted through the interstices of the upper screen 15. Simultaneously with the movement of the upper agitator 22, as above described, the lower agitator 33 will be caused to sweep over the lower screen 16 in a direction opposite, but equal to the movement of the upper agitator. This movement of the lower agitator 33 is effected through the engagement of the lug 27 with the open ended slot or notch 28 of the lever 26. The latter lever, as hereinbefore described, being attached fixedly to the lower end of the vertical wire portion 21 has imparted to it a movement of rotation corresponding to the relative rotation of the handle 19 to the brackets 17 and 18. As the notched outer end of the lever 26 swings in an arc, its engagement with the lug 27 of the second lever 29 causes the opposite end of said lever 29 in which the end of the agitator 33 is secured to swing in an arc opposite to or reversely to the swinging movement of the notched end of the lever 26 and opposite to the movement of the upper agitator 22. The material that is projected through the interstices of the upper screen 15 is then caused to be sifted through the screen 16 and a double sifting of the flour is obtained in one operation.

As will be seen from the above, the agitators 22 and 33 will be caused to be swung equally and oppositely above their respective screens by a very slight amount of rotation of the handle 19. This opposite swinging of the two agitators enables the sifting operation to be performed much more rapidly than if the two agitators were caused to move one above the other in the same sense or direction as with the usual construction of devices of this character wherein a plurality of agitators and screens are provided. The manner of mounting the agitators and of connecting them with the supporting handle 19 insures that agitators will be swung through their full arc of permissive movement but by a very slight degree of rotation of the handle relatively to its supporting brackets and container. The weight of the material, as above pointed out, within the container tends to hold the container nearly stationary so that the shaking movement given to the handle 19 is practically all utilized for producing merely the relative rotation of the handle necessary to bring about the relative swinging of the agitators over the screens.

It will be noted that the construction is comparatively simple and inexpensive. The engagement of the vertical portion 21 of the handle with the apertures 23 and 24 of the brackets 17 and 18, respectively, serves to maintain the handle securely but rotatably between the brackets. These brackets can be made of strong and sturdy material and they can be securely fastened to the cylindrical container in any suitable way that will insure a comparatively long period of service of the device. The pivotal mounting of the lever 29 to the rigid handle 19 can also be effected cheaply but yet so as to provide a very durable and sturdy construction. It will be seen that the connection between the lower agitator and the handle formed by the two levers 26 and 29, forms in effect a linkage mechanism. The notch 28 of the lever 26 and the lug 27 of the lever 29 have their engaging surfaces preferably shaped approximately in the form of involute gear teeth surfaces thereby to insure the best functioning of these members and obviate any tendency of the parts to jam or stick and also to avoid any appreciable amount of lost motion.

While I have described and shown a suitable and practical commercial construction of a device embodying the principles of my invention, it will be understood that many changes, variations and modifications of the specific constructional details illustrated may be resorted to without departing from such principles.

I claim:

1. In a device of the character described a container, a pair of sieves secured within such container in spaced superimposed relationship, a supporting handle rotatably associated with said container, a pair of agitators, one for each of said sieves, a direct connection between one of said agitators and said rotatable handle to cause said agitator to be moved relatively to its respective sieve when said handle is rotated, means for connecting the second of said agitators pivotally to said container, and a linkage mechanism associated with said handle and such second agitator to cause the latter to be moved on its pivotal mounting by the rotation of said handle in a direction opposite to the direction of the movement of the first named agitator.

2. In a device of the character described a container, a pair of sieves secured within such container in spaced superimposed relationship, a supporting handle rotatably associated with said container, a pair of agitators, one for each of said sieves, a direct connection between one of said agitators and said rotatable handle to cause said agitator to be moved relatively to its respective sieve when said handle is rotated, means for connecting the second of said agitators pivotally to said container, a lever secured to said handle for rotation therewith and means for connecting said lever to said second agitator to cause said agitator to be actuated by the rotation of said handle.

3. In a device of the character described a container, a pair of sieves secured within such container in spaced superimposed relationship, a supporting handle rotatably associated with said container, a pair of agitators, one for each of said sieves, a direct connection between one of said agitators and said rotatable handle to cause said agitator to be moved relatively to its respective sieve when said handle is rotated, means for connecting the second of said agitators pivotally to said container, a lever secured to said handle and means for connecting said lever to said second agitator comprising a notched member and a projection fitting into the notch of said member.

4. In a device of the character described a container, a pair of sieves secured within such container in spaced superimposed relationship, a supporting handle rotatably associated with said container, a pair of agitators, one for each of said sieves, a direct connection between one of said agitators and said rotatable handle to cause said agitator to be moved relatively to its respective sieve when said handle is rotated, means for connecting the second of said agitators pivotally to said container, a lever secured to said handle and means for connecting said lever to said second agitator comprising a notched member and a projection fitting into the notch of said member, said notch and lever being formed with engaging surfaces similar to involute gear teeth surfaces.

AUGUST W. BERGENER.